United States Patent [19]

Kleiner et al.

[11] 3,966,651

[45] June 29, 1976

[54] PROCESS FOR THE PRODUCTION OF FINE-CELL POLYOLEFIN FOAMS

[75] Inventors: Frank Gerald Kleiner, Cologne; Karl Heinz Müller, Quadrath-Ichendorf, both of Germany

[73] Assignee: Bayer Aktiengesellschaft, Germany

[22] Filed: Oct. 8, 1974

[21] Appl. No.: 513,126

[30] Foreign Application Priority Data

Oct. 13, 1973  Germany............................ 2351515

[52] U.S. Cl. ........................ 260/2.5 HA; 260/2.5 H
[51] Int. Cl.² ......................... C08J 9/06; C08J 9/10
[58] Field of Search .............................. 260/2.5 HA

[56] References Cited
UNITED STATES PATENTS

| | | | |
|---|---|---|---|
| 3,098,831 | 7/1963 | Carr | 260/2.5 HA |
| 3,278,466 | 10/1966 | Cram et al. | 260/2.5 HA |
| 3,645,930 | 2/1972 | Normanton | 260/2.5 HA |
| 3,645,931 | 2/1975 | Normanton | 260/2.5 HA |
| 3,876,566 | 4/1975 | Koshak et al. | 260/2.5 HA |
| 3,882,209 | 5/1975 | Yanagisawa et al. | 260/2.5 HA |

*Primary Examiner*—Morton Foelak
*Attorney, Agent, or Firm*—Connolly and Hutz

[57] ABSTRACT

A process for the production of a fine-celled foam from a mixture of a polyolefin, a peroxide capable of peroxidically cross-linking the polyolefin and a principal blowing agent having a decomposition point or decomposition range above about 190°C, wherein a further blowing agent, an auxiliary blowing agent, having a decomposition range of from 130° to about 190°C is added in a quantity of from 0.1 to 1.5 percent by weight, based on said principal blowing agent, to said mixture, the mixture thus obtained is worked up under such conditions that neither cross-linking nor appreciable foaming takes place to a moulding, which is subsequently, cross-linked and foamed by heating to temperatures above 190°C.

13 Claims, No Drawings

PROCESS FOR THE PRODUCTION OF FINE-CELL POLYOLEFIN FOAMS

This invention relates to a process for the production of fine-cell foams from peroxidically cross-linked polyolefins using at least two blowing agents with different decomposition temperatures or decomposition ranges.

It is known that organic peroxides and blowing agents may be added to polyethylene and the resulting mixture extruded to form a sheet under such conditions that neither does cross-linking take place to any appreciable extent, nor the blowing agent is decomposed. This sheet is then heated in a hot-air oven to a temperature above 150°C so that the cross-linking reaction occures and by increasing the temperature above 190°C later on the decomposition of the blowing agent starts, whereby the cross-linked polyethylene is foamed by the gas thus foamed (cf. DT-OS 1,694,130; US-PS 3,098,831).

The preferred blowing agent for this process is azodicarbonamide, because it does not have any deleterious effect upon the cross-linking of the polyethylene by the organic peroxides.

The disadvantage attending the use of azodicarbonamide is the formation of cell structure with relatively large cells. It is known from other foaming processes that the decomposition point of azodicarbonamide may be lowered more or less by the addition of so-called "kickers," whereby the cell size of the foams produced may be reduced. Magnesium, zinc, cadmium, barium or lead compounds, for example, have been used as kickers.

Unfortunately, the use of kickers in the production of peroxidically cross-linked foams from polyethylene gives rise to difficulties insofar as the substances used as kickers interfere with the function of the peroxide to some extent, and in doing so either wholly or partially prevent cross-linking, or adversely affect the subsequent foaming process to such an extent that the density of the foam obtained is not sufficiently high. In addition, the cells formed are not smaller, but in fact larger since cross-linking has not progressed far enough by the time and temperature the blowing agent already begins to decompose.

Since it was known from the literature that thermoplastic foams are formed with particularly fine cells when at the moment of decomposition of the blowing agent the thermoplast melt is saturated with the gas, i.e. nitrogen in the case of azodicarbonamide which is eliminated by the decomposition, attempts have been made to obtain the required saturation by saturating the melt with gaseous nitrogen in the extruder. However, this has been found to be extremely difficult and to involve unreasonable outlay because the quantities of gas required are extremely small in relation to the volume of the thermoplast melt, and thus the gas can hardly be distributed and dissolved in the melt uniformly. Additionally if the added gas leaves the melt during the extrusion and expanding on leaving the nozzle and forms more or less numerous large or small bubbles, an extremely irregular cell structure with cells having a variety of different diameters are obtained in the case that this bubble-containing sheet is subsequently foamed. In order, therefore, to reduce the size of the cells, one has to make sure that saturation of the thermoplast melt with gas is obtained without the formation of bubbles.

Surprisingly, it has been possible to achieve this result by adding to the principal blowing agent with a decomposition point or range above 190°C, a small quantity of a second blowing agent (auxiliary blowing agent) whose decomposition point or decomposition range is slightly below that of the main expanding agent. This second blowing agent, which preferably should not spontaneously decompose, which instead should show a gradual decomposition characteristic, is added in such quantities that the extruded sheet does not contain any bubbles.

Accordingly, the present invention relates to a process for the production of a fine-celled foam from a mixture of a polyolefin, a peroxide and a principle blowing agent having a decomposition point or decomposition range above 190°C, wherein in addition to said peroxide and said blowing agent a further blowing agent, an auxiliary blowing agent having a decomposition range of from 130° to about 190°C is added in a quantity of from 0.01 to 1.5 percent by weight, based on said principal blowing agent, to the polyolefin, the mixture thus obtained is worked up under such conditions that neither cross-linking nor appreciable foaming takes place to a moulding, which is subsequently cross-linked and foamed by heating to temperatures above 190°C.

Suitable polyolefins include polyethylenes or polypropylenes, preferably polyethylenes, including low-pressure polyethylenes (d ~ 0.94 - 0.97 g/cc) and high-pressure polyethylenes (d ~ 0.91 - to about 0.94 g/cc), which are produced by known processes. High-pressure polyethylenes are preferred.

Peroxides suitable for the purposes of the invention include organic peroxides having a decomposition temperature above 150°C such as dicumyl peroxide, 2,5-dimethyl-2,5-di-(t-butylperoxy)-hexane, 2,5-dimethyl-2,5-di-(t-butylperoxy)-hexyne, t-butylhydroperoxide, cumyl-t-butylperoxide, di-t-butylperoxide and bis-(t-butylperoxyisopropyl)-benzene, dicumyl peroxide is preferred.

The peroxides are used in quantities of from 0.3 to 1.5 percent by weight, based on the mixture as a whole.

As main blowing agent with a decomposition point or range above about 190°C azodicarbonamide and dinitrosopentamethylene tetramine are used. Azodicarbonamide is preferred. They are used in quantities of from 2 to 30 percent by weight, based on the mixture as a whole.

Compounds suitable for use as the auxiliary blowing agent with a decomposition range from about 130° to about 190°C, preferably from 150° to 185°C are preferably disulfonylhydrazides of the general formula

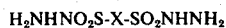

in which X represents an alkyl radical with up to 6 carbon atoms, a cycloalkyl radical with 4 to 7 carbon atoms, an aryl radical with 6 to 12 carbon atoms or an aromatic radical of the formula

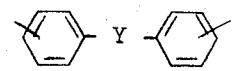

with Y = O, $SO_2$, S or a divalent linkage, or sulfonylhydrazide of the general formula $$X - SO_2 - NHNHR$$

in which X has the meaning given above and R represents an acyl radical with 3 to 6 carbon atoms or a radical of the formula $$- R'COR''$$

with R' and R" being the same or different, an aliphatic radical with 1 to 5 carbon atoms.

The sulfonylhydrazides include 1,4-butane, disulfonylhydrazide cyclohexane disulfonylhydrazide, 1,3-benzene disulfonylhydrazide, naphthalene-1,5-disulfonylhydrazide, N'-acetonyl-benzene sulfonyl hydrazide, N'-acetylbenzene sulfonylhydrazide, diphenylsulphone-3,3'-disulfonylhydrazide, diphenylene oxide-disulfonylhydrazides 3,3'-diphenyldisulfonylhydrazide and diphenyl ether disulfonylhydrazides, 3,3'-diphenyl ether disulfonylhydrazide is preferred.

It is also possible to use mixtures of the aforementioned sulphohydrazides or pure commercial-grade products (80 to 95 percent pure), whereby the above-mentioned decomposition points or ranges of the pure substances are reduced or enlarged.

The sulfonylhydrazides are used in quantities of from 0.1 to 1.5 percent by weight, and preferably in quantities of from 0.1 to 0.8 percent by weight, based on the main blowing agent. They are added to the mixture to be foamed either directly or admixed with part of the polyolefin.

The polyolefins are preferably mixed with the cross-linking and blowing agents or their concentrates in the extruder, followed by moulding at temperatures below the decomposition point of the peroxides. The average residence time in the extruder is about 5 minutes, in order that the mixture to be foamed undergo little or no cross-linking at this stage.

The actual cross-linking process takes place at temperatures in the range of from 190° to 250°C.

By foaming a moulding, for example, a sheet, produced in this way a foamed article is obtained with cells having a diameter of between ¼ and 1/5 of that of the cells of a foam produced without the addition of a second blowing agent.

The foams produced in accordance with the invention may be used as an insulating material in the building and packaging industries. The densities of the foams produced in accordance with the invention may be between about 25 and 200 kg/m³. They are distinguished by their extremely fine cell structure. Preferably at least 30 cells are formed per cc, corresponding to a total of 300,000 pores for a density of at least 30 kg/m³.

The process according to the invention is illustrated by, but by no means limited to, the following Examples. The parts and percentage contents quoted in the Examples are parts and percentages by weight, unless otherwise stated. The high-pressure polyethylenes used in the Examples have densities of about 0.92 g/cc.

Example 1 (Comparison Test)

A rough sheet was produced under conventional conditions by mixing 64 parts of a high-pressure polyethylene, 15 parts of azodicarbonamide and 1 part of dicumyl peroxide for 10 minutes on a mixing roll (roll temperature 110°C). A 3.2 mm thick sheet was pressed from this rough sheet at a temperature of 110°C. The sheet thus obtained was subsequently heated in a recirculating-air oven first for 3 minutes to 150°C and then for 3 minutes to 210°C, as a result of which it was foamed. The 10 mm thick foam had a density of 30 g/l and a uniform cell structure and contained an average 75 to 80,000 cells per gramme.

Example 2 (Comparison Test)

The following comparison test shows that it is not possible to obtain a uniform cell structure by using the second blowing agent in amounts greater than according to the invention, for example, in quantities of about 6 percent, based on the first blowing agent (azodicarbonamide).

64 parts of the same high-pressure polyethylene as in comparison test 1, 15 parts of azodicarbonamide, 1 part of dicumyl peroxide and 1 part of diphenylene oxide-3,3'-disulfonylhydrazide with a decomposition point of about 175°C (auxiliary blowing agent) were processed in the same way as described in comparison test 1. The foam formed with a density of 30 g/l had an extremely irregular pore structure consisting partly of oversized cells and partly of very small cells, and contained approximately 60,000 pores per gramme.

Example 3

64 parts of the same high-pressure polyethylene as in comparison test 1, 15 parts of azodicarbonamide and 1 part of dicumyl peroxide and 0.1 part of diphenylene oxide-3,3'-disulfonylhydrazide were mixed and processed in the same way as described in comparison test 1. The foamed sheet formed showed a highly uniform, extremely fine-cell structure and contained from 350,000 to 400,000 cells per gramme and had a density of 30 g/l.

Example 4 (Comparison Test) 3)

A foamed sheet was produced without the addition of a second blowing agent in the following way. A mixture of 50 parts of a concentrate consisting of a high-pressure polyethylene and 30 parts of azodicarbonamide and of 20 parts of concentrate consisting of 95 parts of high-pressure polyethylene and 5 parts of dicumyl peroxide and of 30 parts of the same high-pressure polyethylene was extruded into a 40 cm wide, 3.2 mm thick sheet at a temperature of 130°C by means of an extruder equipped with a sheet die and a calender. During this processing neither significant cross-linking, nor any blowing occured. The sheet was heated to 210°C in a hot-air oven and thus expanded. Although the foam obtained has a density of 32 g/l and showed a uniform foam structure, it only contained about 65,000 cells per gramme.

Example 5 (Comparison Test 4)

The following comparison test shows that an inadequate foam structure is obtained when the second blowing agent is used in a quantity of only about 0.06 percent, based on the first blowing agent.

0.1 part of a concentrate consisting of 10 parts of diphenyl-3,3'-disulfonylhydrazide with a melting, respectively decomposition range of 151° to 157°C, and 90 parts of high-pressure polyethylene were added to a mixture comprising 50 parts of a concentrate consisting of 30 parts of azodicarbonamide and 70 parts of high-pressure polyethylene, 20 parts of a concentrate consisting of 5 parts of dicumyl peroxide and 95 parts of high-pressure polyethylene and the resulting mixture was extruded to a sheet and was subsequently foamed in a recirculating air-oven in the same way as described in comparison test 3. The foam obtained showed a relatively uniform cell structure with predominantly fine cells and the odd, distinctly coarser pore. However, the foam only contained approximately 95,000 pores per gramme, based on the fine cells.

Example 6

A sheet was produced and expanded as described in comparison test 4, except that the quantity of the second blowing agent was changed to 1 part of a concentrate consisting of 10 parts of diphenyl-3,3'-disulfonylhydrazide and 90 parts of high-pressure polyethylene. By extrusion and expansion a foam which had a completely uniform cell structure with extremely fine cells was obtained. The foam contained an average of 350,000 cells per gramme.

We claim:

1. A process for the production of a fine-celled foam which comprises forming a mixture of a polyolefin, a crosslinking amount of an organic peroxide capable of crosslinking the polyolefin, 2 to 30 percent by weight, based on the weight of the mixture, of a principal blowing agent having a decomposition point or decomposition range above about 190°C. and 0.1 to 1.5 percent by weight, based on the weight of said principal blowing agent, of an auxiliary blowing agent working up said mixture to form a shaped object under conditions that neither crosslinking nor appreciable foaming thereof takes place and subsequently crosslinking and foaming said shaped object by heating it to a temperature above 190°C., said auxiliary blowing agent being a disulfonylhydrazide of the formula

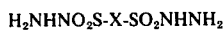

wherein X is an alkyl radical having up to 6 carbon atoms, a cycloalkyl radical having 4 to 7 carbon atoms, an aryl radical having 6 to 12 carbon atoms or an aromatic radical of the formula

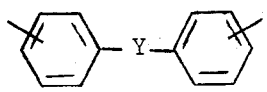

wherein Y is 0, $SO_2$, S or a bond or a sulfonylhydrazide of the formula

wherein X is as aforesaid and R is acyl having 3 to 6 carbon atoms or -R'COR'' wherein R' and R'' are the same or different aliphatic radicals having 1 to 5 carbon atoms.

2. A process as claimed in claim 1 wherein the polyolefin is polypropylene or polyethylene.

3. A process as claimed in claim 2 wherein the polyolefin is high-pressure polyethylene.

4. A process as claimed in claim 1, wherein the peroxide has a decomposition temperature above 150°C.

5. A process as claimed in claim 1, wherein the peroxide is dicumyl peroxide, 2,5-dimethyl-2,5-di-(t-butylperoxy)-hexane, 2,5-dimethyl-2,5-di-(t-butylperoxy)-hexyne, t-butylhydroperoxide, cumyl-t-butylperoxide, di-t-butylperoxide or bis-(t-butylperoxy-isopropyl)-benzene.

6. A process as claimed in claim 1, wherein the peroxide is used in an amount of from 0.3 to 1.5 percent by weight, based on the mixture.

7. A process as claimed in claim 1, wherein the principal blowing agent has a decomposition temperature above 190°C.

8. A process as claimed in claim 1, wherein the principal blowing agent is azodicarbonamide or dinitrosopentamethylene tetramine.

9. A process as claimed in claim 1, wherein the auxiliary blowing agent has a decomposition temperature or range of from 150° to 185°C.

10. A process as claimed in claim 1, wherein the auxiliary blowing agent is used in an amount of from 0.1 to 0.8 % by weight, based on the principal blowing agent.

11. A process as claimed in claim 1, wherein the mixture is worked up in an extruder.

12. A process as claimed in claim 1, wherein the moulding is cross-linked and expanded in a hot-air oven.

13. A process as claimed in claim 1 wherein the auxiliary blowing agent is 1,4-butane disulfonylhydrazide, cyclohexane disulfonylhydrazide, 1,3-benzene disulfonylhydrazide, naphthalene-1,5-disulfonylhydrazide, N'-acetonyl-benzene sulfonylhydrazide, N'-acetylbenzene sulfonylhydrazide, diphenylsulfone-3,3'-disulfonylhydrazide, diphenylene oxide-3,3'-disulfonylhydrazide, 3,3'-diphenyldisulfonylhydrazide or diphenyl ether-3,3'-disulfonylhydrazide.

* * * * *